(12) United States Patent
Zhou et al.

(10) Patent No.: US 10,007,307 B1
(45) Date of Patent: Jun. 26, 2018

(54) ELECTRONIC DEVICE SHELL AND ELECTRONIC DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Yan-Fang Zhou, Hubei (CN); Wen-Hsiang Hung, New Taipei (TW); Ching-Jou Chen, New Taipei (TW)

(73) Assignees: HONG FU JIN PRECISION INDUSTRY (WuHan) CO., I, Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days. days.

(21) Appl. No.: 15/679,611

(22) Filed: Aug. 17, 2017

(30) Foreign Application Priority Data

Jun. 29, 2017 (CN) .......................... 2017 1 0518228

(51) Int. Cl.
*G06F 1/18* (2006.01)
*G06F 1/20* (2006.01)

(52) U.S. Cl.
CPC .............. *G06F 1/185* (2013.01); *G06F 1/184* (2013.01); *G06F 1/187* (2013.01); *G06F 1/20* (2013.01)

(58) Field of Classification Search
CPC .......... G06F 1/184; G06F 1/185; G06F 1/186; G06F 1/187; G06F 1/20
See application file for complete search history.

(56) References Cited

U.S. PATENT DOCUMENTS

| 6,088,224 | A  | * | 7/2000  | Gallagher | G06F 1/184 165/104.33 |
| 6,201,705 | B1 | * | 3/2001  | Nygren    | H05K 7/1425 165/80.3 |
| 6,937,475 | B2 | * | 8/2005  | Rigimbal  | G06F 1/181 174/520 |
| 7,307,851 | B2 | * | 12/2007 | Dimarco   | H05K 7/1407 361/752 |
| 7,342,807 | B2 | * | 3/2008  | Mueller   | H05K 7/1424 174/521 |
| 7,428,146 | B2 | * | 9/2008  | Han       | G06F 1/181 312/223.2 |
| 7,486,506 | B2 | * | 2/2009  | Chen      | G06F 1/181 312/223.2 |
| 7,539,010 | B2 | * | 5/2009  | Chen      | G06F 1/181 361/679.58 |
| 7,639,505 | B2 | * | 12/2009 | Chen      | G06F 1/185 312/223.1 |
| 7,642,453 | B2 | * | 1/2010  | Cheng     | G06F 1/181 174/17 R |

(Continued)

*Primary Examiner* — Dimary Lopez Cruz
*Assistant Examiner* — Abhishek Rathod
(74) *Attorney, Agent, or Firm* — ScienBiziP, P.C.

(57) ABSTRACT

An electronic device shell can be configured to compactly receive at least one expansion card. The electronic device shell comprises a bottom plate, a front plate connected with a front end of the bottom plate, and a rear plate connected with a rear end of the bottom plate. The front plate is recessed away from the rear plate to form a first lead portion. The expansion card is located on the bottom plate and between the front plate and the rear plate. One end of the expansion card is secured on the rear plate, and the other end of the expansion card is received in the first lead portion.

14 Claims, 4 Drawing Sheets

(56) References Cited

U.S. PATENT DOCUMENTS

| | | | | |
|---|---|---|---|---|
| 8,253,015 B2* | 8/2012 | Chang | ............... | G06F 1/181 |
| | | | | 174/50 |
| 8,351,199 B2* | 1/2013 | Tian | ............... | G06F 1/206 |
| | | | | 361/679.02 |
| 2002/0089818 A1* | 7/2002 | Chen | ............... | G06F 1/181 |
| | | | | 361/679.02 |
| 2003/0210514 A1* | 11/2003 | Liu | ............... | G06F 1/181 |
| | | | | 361/679.02 |
| 2006/0146490 A1* | 7/2006 | Chen | ............... | G06F 1/181 |
| | | | | 361/679.02 |
| 2008/0278900 A1* | 11/2008 | Mau | ............... | G06F 1/181 |
| | | | | 361/679.02 |
| 2009/0059503 A1* | 3/2009 | Cheng | ............... | G06F 1/181 |
| | | | | 361/679.02 |
| 2010/0002367 A1* | 1/2010 | Chang | ............... | G06F 1/181 |
| | | | | 361/679.02 |
| 2011/0012482 A1* | 1/2011 | Chen | ............... | G06F 1/188 |
| | | | | 312/213 |
| 2011/0156552 A1* | 6/2011 | Liu | ............... | G06F 1/181 |
| | | | | 312/223.2 |
| 2012/0033387 A1* | 2/2012 | Li | ............... | G06F 1/185 |
| | | | | 361/730 |
| 2012/0224340 A1* | 9/2012 | Geng | ............... | G06F 1/185 |
| | | | | 361/759 |
| 2012/0289141 A1* | 11/2012 | Wu | ............... | G06F 1/20 |
| | | | | 454/184 |
| 2015/0003001 A1* | 1/2015 | Yin | ............... | G06F 1/186 |
| | | | | 361/679.32 |
| 2015/0163959 A1* | 6/2015 | Yang | ............... | G06F 1/20 |
| | | | | 361/695 |
| 2015/0185790 A1* | 7/2015 | Fan | ............... | G06F 1/186 |
| | | | | 361/679.02 |
| 2016/0255737 A1* | 9/2016 | Xiao | ............... | H05K 7/1429 |
| | | | | 361/753 |

* cited by examiner

ELECTRONIC DEVICE SHELL AND ELECTRONIC DEVICE

CROSS-REFERENCE TO RELATED APPLICATIONS

This application claims priority to Chinese Patent Application No. 201710518228.3 filed on Jun. 29, 2017 the contents of which are incorporated by reference herein.

FIELD

The subject matter herein generally relates to miniaturization in electronic devices and their shells.

BACKGROUND

The size of a computer shell is becoming smaller and smaller. However, electronic components in the computer shell, such as expansion cards, hard drives, and power supplies are still necessary, so the shell must create more space to install these electronic components. Improvement in the art is preferred.

BRIEF DESCRIPTION OF THE DRAWINGS

Implementations of the present disclosure will now be described, by way of example only, with reference to the attached figures.

DETAILED DESCRIPTION

Figure 1:
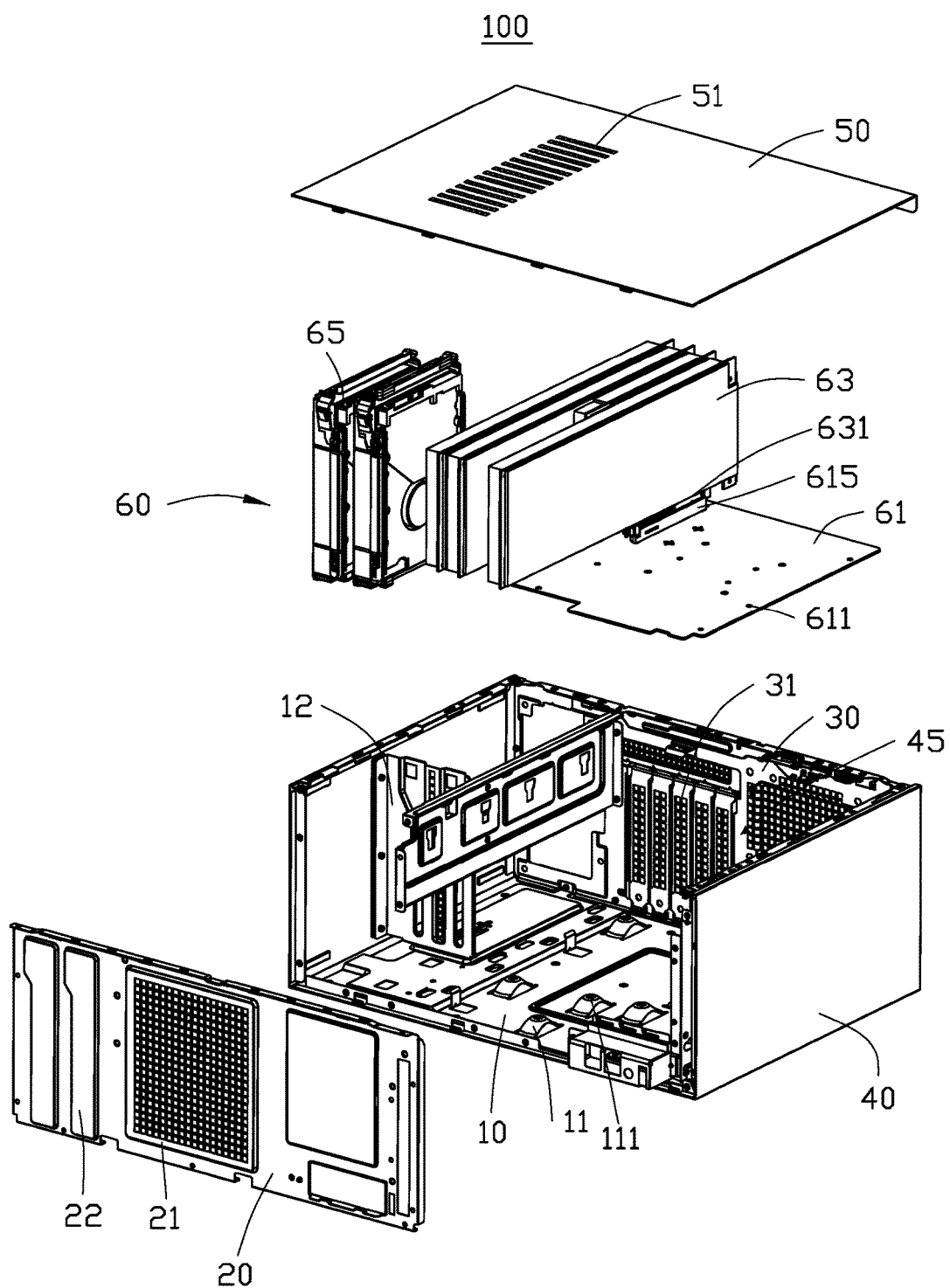
FIG. 1 is an exploded view of an exemplary embodiment of an electronic device shell and a plurality of electronic components.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "outside" refers to a region that is beyond the outermost confines of a physical object. The term "inside" indicates that at least a portion of an object is contained within a boundary formed by another object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 illustrates one exemplary embodiment of an electronic device shell 100 configured to receive at least one electronic component 60.

Figure 2:
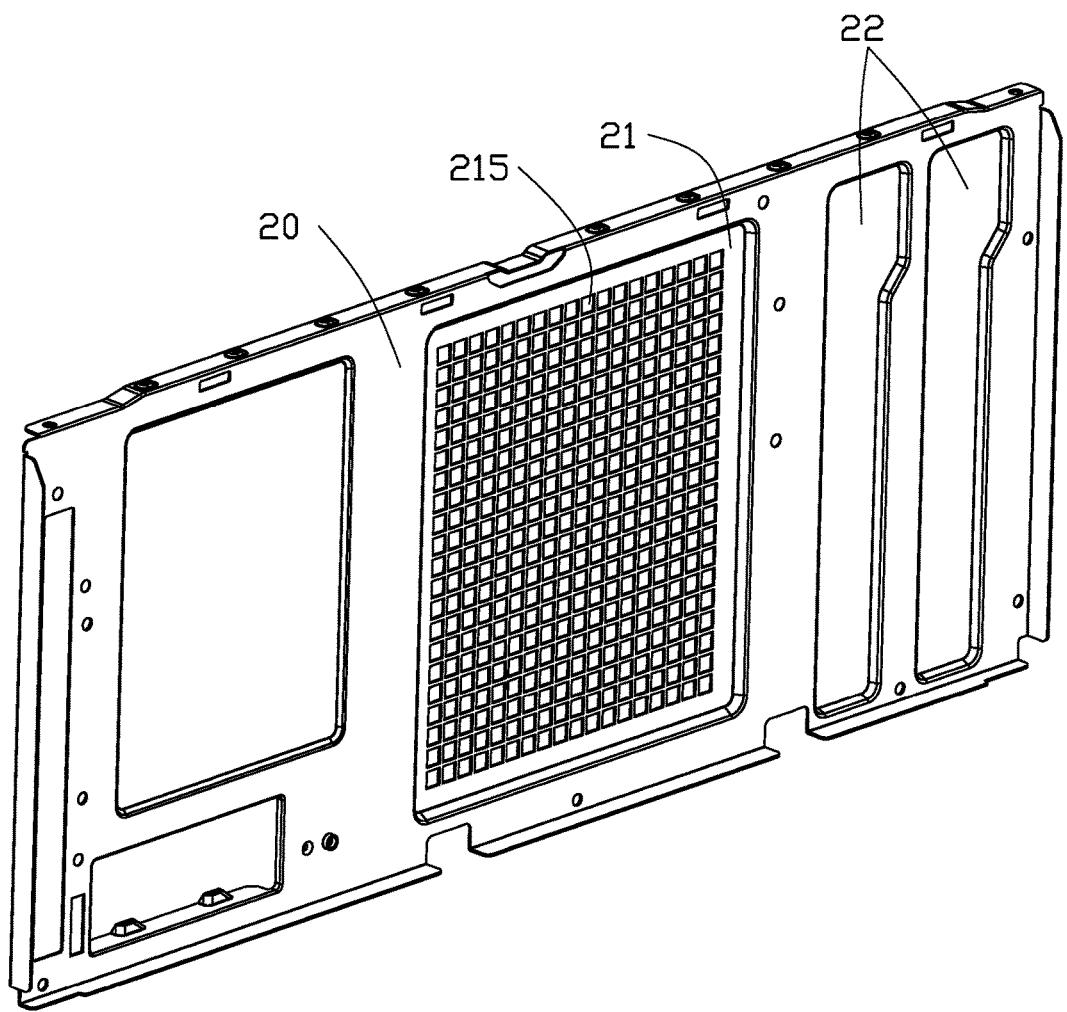
FIG. 2 is a diagram of a front plate of the shell of FIG. 1.

FIG. 1 and FIG. 2 illustrate that the electronic device shell 100 includes a bottom plate 10, a front plate 20 connected with a front end of the bottom plate 10, a rear plate 30 connected with a rear end of the bottom plate 10, two side plates 40 connected with the bottom plate 10, and a cover 50 parallel to the bottom plate 10. The bottom plate 10, the front plate 20, the rear plate 30, the side plates 40, and the cover 50 cooperatively define a receiving space 45, and the electronic components 60 are received in the receiving space 45.

The bottom plate 11 is provided with a plurality of securing portions 11, and each securing portion 11 defines a securing hole 111. A plurality of fasteners (not shown) can be inserted into the securing holes 111. The bottom plate 11 is provided with a mounting plate 12 at one end close to the one of the side plates 40.

The front plate 20 is recessed away from the rear plate 30 to form a first lead portion 21 and at least one second lead portion 22 as shown in FIG. 2. The first lead portion 21 and the second lead portion 22 are in air communication with the receiving space 45. The first lead portion 21 and the second lead portion 22 receive electronic components 60. The first lead portion 21 defines a plurality of air holes 215, and the air holes 215 are in air communication with the receiving space 45.

Referring to FIG. 1, the rear plate 30 defines a plurality of card slots 31 configured to connect to electronic components 60. The cover 50 defines a plurality of heat emission holes 51 to cool the electronic device shell 100. In at least one embodiment, the quantity of the second lead portions 22 is two.

The electronic components 60 include, but are not limited to, a main board 61, a plurality of expansion cards 63 mounted on the main board 61, and a plurality of data storages 63 detachably mounted in the electronic device shell 100.

The main board 61 defines a plurality of through holes 611 corresponding to the securing holes 111. The fasteners pass through the through holes 611 and are inserted into the securing holes 111 to secure the main board 61 on the bottom plate 10. The main board 61 is further provided with a plurality of slots 615, and a bottom portion of each expansion card 63 is provided with a connecting member 631. The connecting member 631 can be inserted into the slot 615 to electrically connect the main board 61 with the expansion card 63.

One end of each expansion card 63 is provided with an engaging member (not shown). The engaging member can be inserted into the card slot 31 of the rear plate 30 to secure the expansion card 63 on the rear plate 30. The other end of each expansion card 63 can be received in the first lead portion 21. The data storages 65 are secured on the bottom plate 10, one end of each data storage 65 is mounted on the mounting plate 12 and the other end of each data storage 65 is received in the second lead portion 22.

Figure 3:
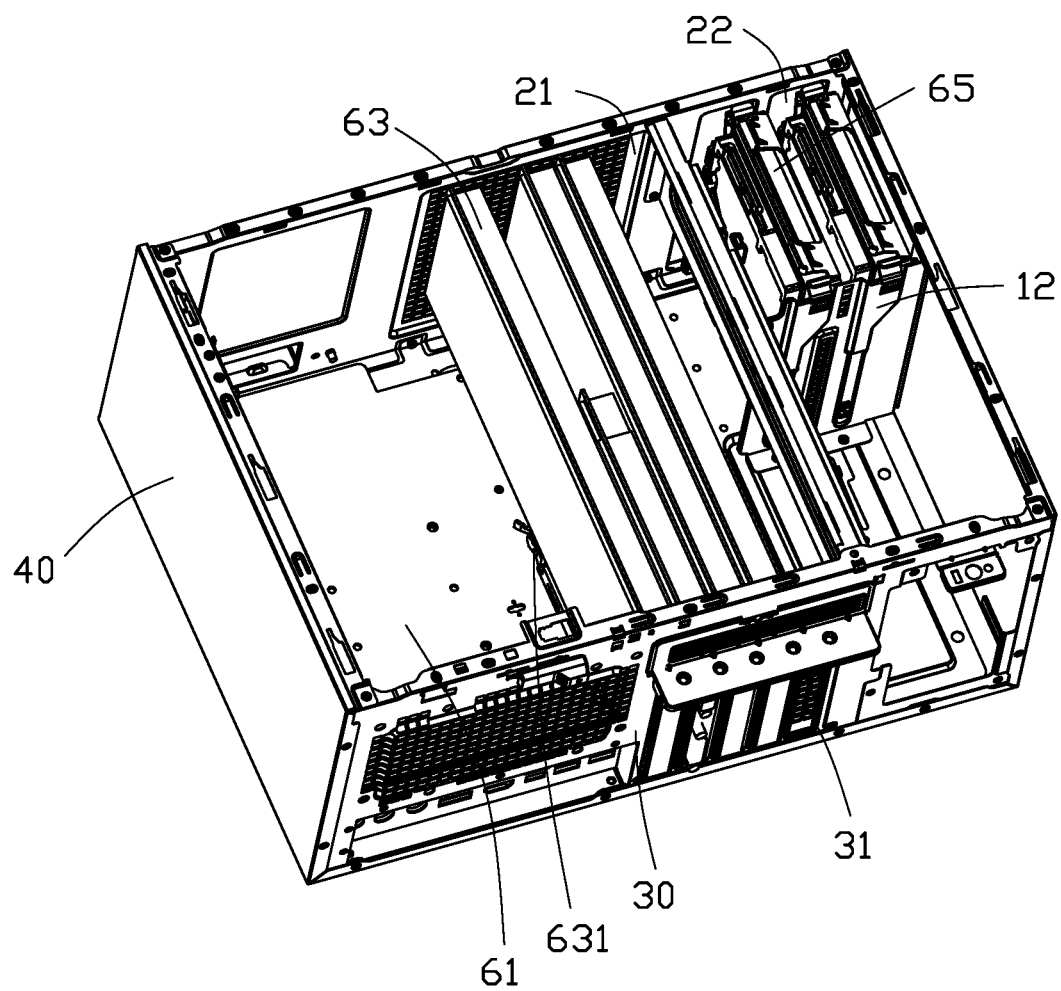
FIG. 3 is an assembled view of the electronic device shell and the electronic components of FIG. 1 without a cover.
Figure 4:
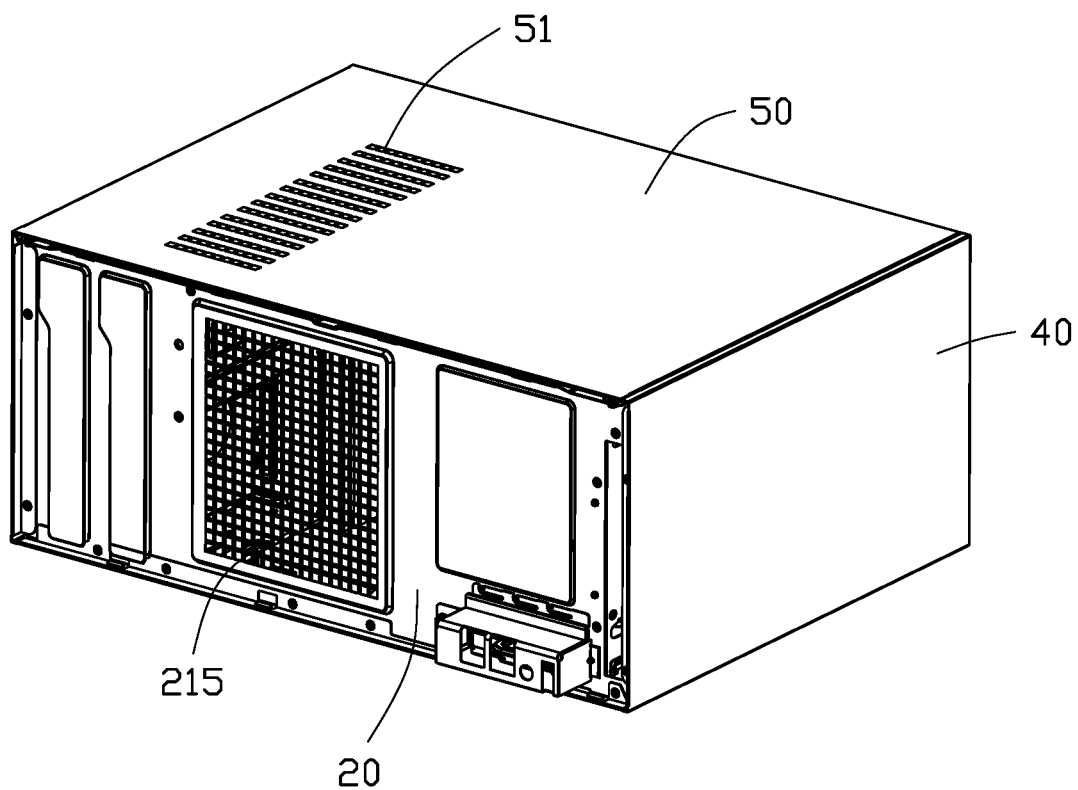
FIG. 4 is similar to FIG. 3 viewed from another angle.

FIG. 3 and FIG. 4 illustrate assembly of the electronic device shell 100. The main board 61 is placed in the receiving space 45, the through holes 611 of the main board 61 are aligned with the securing holes 111 of the bottom plate 10, and the fasteners pass through the through holes 611 for insertion into the securing holes 11 to secure the main board 61 on the bottom plate 10.

The connecting members 631 of the expansion cards 63 are inserted into the slots 615 of the main board 61 to electrically connect the expansion card 63 with the main board 61. The engaging members (not shown) of one end of the expansion cards 63 are inserted into the card slot 31 of the rear plate 30 to secure the expansion cards 63 on the rear plate 30. The other ends of the expansion cards 63 are received in the first lead portion 21 of the front plate 20.

The data storages 65 are placed in the receiving space 45 and secured on the bottom plate 10. One end of each data storage 65 is mounted on the mounting plate 12, and the other end of each data storage 65 is received in the second lead portion 22 of the front plate 20. Thereby, the electronic components 60 are mounted in the electronic device shell 100.

The exemplary embodiments shown and described above are only examples. Many details are often found in the art such as the other features of electronic device shell. Therefore, many such details are neither shown nor described. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. An electronic device shell receiving at least one expansion card, comprising:
   a bottom plate;
   a front plate connected with a front end of the bottom plate; and
   a rear plate connected with a rear end of the bottom plate;
   wherein a first portion of the front plate is recessed away from the rear plate to form a first lead portion, the at least one expansion card is on the bottom plate and between the front plate and the rear plate, one end of the expansion card is secured on the rear plate, and the other end of the expansion card is received in the first lead portion;
   wherein a second portion of the front plate is recessed away from the rear plate to form at least one second lead portion, a plurality of data storages are received in the electronic device shell, each data storage is secured on the bottom plate, and one end of each data storage is received in the second lead portion.

2. The electronic device shell of claim 1, wherein one end of each expansion card comprises an engaging member, the rear plate defines a plurality of card slots, and each engaging member is removably inserted into one card slot to secure the at least one expansion card on the rear plate.

3. The electronic device shell of claim 1, wherein the electronic device shell comprises two side plates respectively connected with both sides of the bottom plate and a cover parallel to the bottom plate; wherein the bottom plate, the front plate, the rear plate, the side plates, and the cover cooperatively define a receiving space, the expansion card is received in the receiving space.

4. The electronic device shell of claim 3, wherein the first lead portion defines a plurality of air vents, and the air vents are in air communication with the receiving space.

5. The electronic device shell of claim 3, wherein a main board is in the electronic device shell, the main board is received in the receiving space and secured on the bottom plate.

6. The electronic device shell of claim 5, wherein the main board defines a plurality of slots, a bottom portion of each expansion card is provided with a connecting member, each connecting member is inserted into one slot of the main board to electrically connect the main board with the expansion card.

7. The electronic device shell of claim 1, wherein one side portion of the bottom plate connects to a mounting plate, the other end of the data storage is secured on the mounting plate.

8. An electronic device, comprising:
   at least one expansion; and
   an electronic device shell comprising:
   bottom plate;
   a front plate connected with a front end of the bottom plate; and
   a rear plate connected with a rear end of the bottom plate;
   wherein a first portion of the front plate is recessed away from the rear plate to form a first lead portion, the at least one expansion card is on the bottom plate and between the front plate and the rear plate, one end of the expansion card is secured on the rear plate, and the other end of the expansion card is received in the first lead portion;
   wherein a second portion of the front plate is recessed away from the rear plate to form at least one second lead portion, a plurality of data storages are received in the electronic device shell, each data storage is secured on the bottom plate, and one end of each data storage is received in the second lead portion.

9. The electronic device of claim 8, wherein one end of each expansion card comprises an engaging member, the rear plate defines a plurality of card slots, and each engaging member is removably inserted into one card slot to secure the at least one expansion card on the rear plate.

10. The electronic device of claim 8, wherein the electronic device shell comprises two side plates respectively connected with both sides of the bottom plate and a cover parallel to the bottom plate; wherein the bottom plate, the front plate, the rear plate, the side plates, and the cover cooperatively define a receiving space, the at least one expansion card is received in the receiving space.

11. The electronic device of claim 10, wherein the first lead portion defines a plurality of air vents, and the air vents are in air communication with the receiving space.

12. The electronic device of claim 10, wherein a main board is in the electronic device shell, the main board is received in the receiving space and secured on the bottom plate.

13. The electronic device of claim 12, wherein the main board defines a plurality of slots, a bottom portion of each expansion card is provided with a connecting member, each connecting member is inserted into one slot of the main board to electrically connect the main board with the expansion card.

14. The electronic device of claim 8, wherein one side portion of the bottom plate connects to a mounting plate, the other end of the data storage is secured on the mounting plate.

* * * * *